March 22, 1966
W. O. TEMPLE
3,241,382
POWER TRANSMISSION DEVICE
Filed Oct. 15, 1963
2 Sheets-Sheet 1
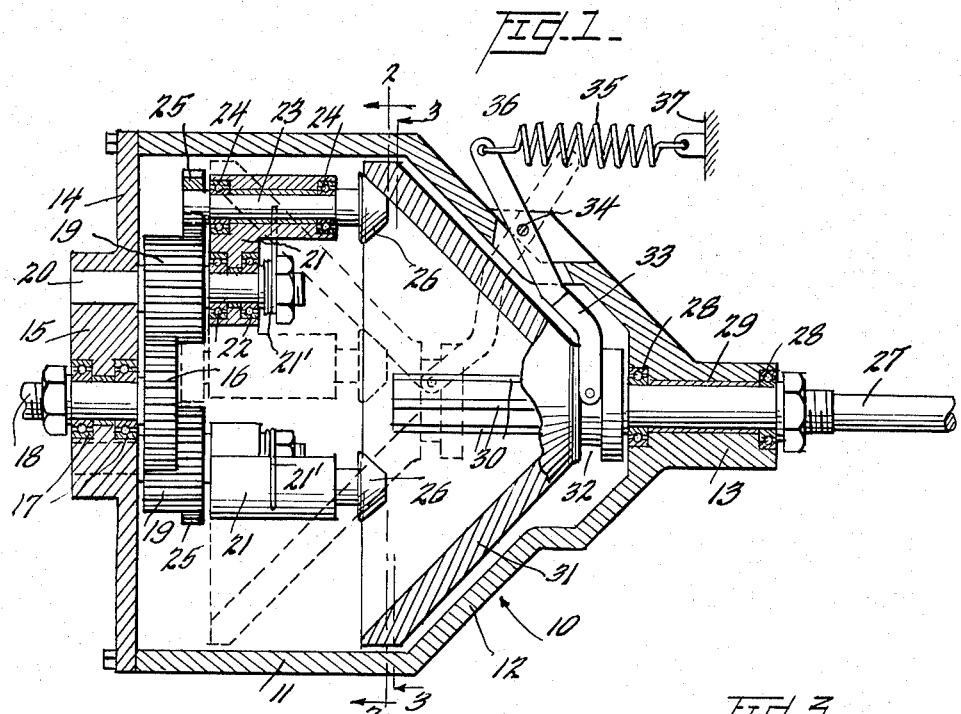
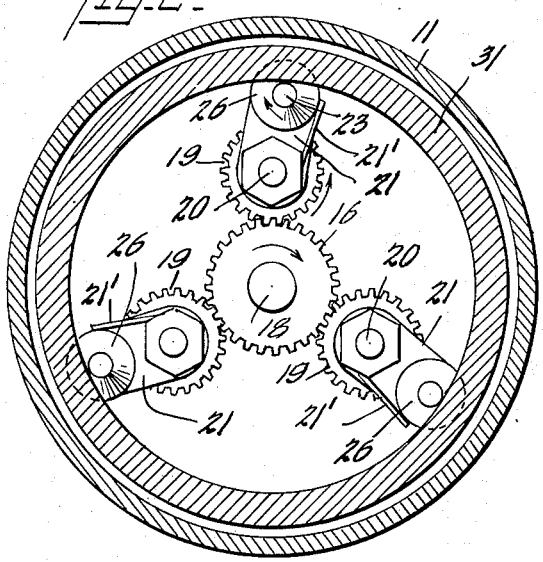
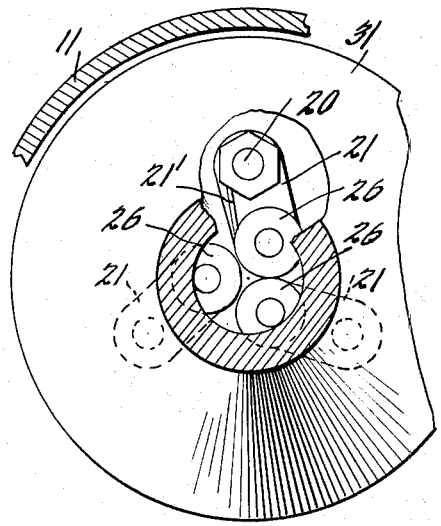
INVENTOR
Wescomb O. Temple,
BY Watson, Cole, Grindle & Watson
ATTORNEYS

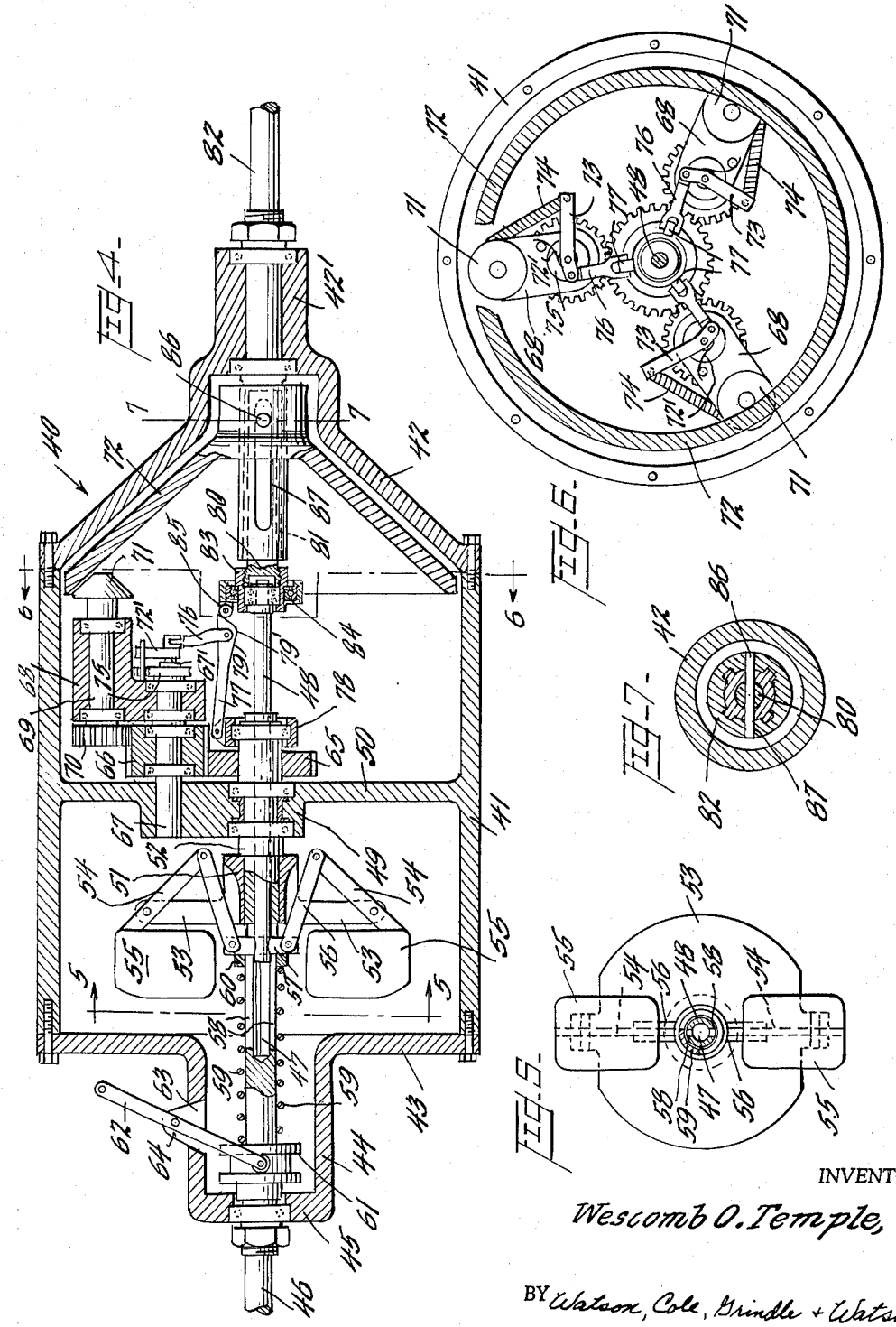

3,241,382
POWER TRANSMISSION DEVICE
Wescomb O. Temple, Carroll, N.H.
(R.F.D. 1, Whitefield, N.H.)
Filed Oct. 15, 1963, Ser. No. 316,263
9 Claims. (Cl. 74—191)

This invention relates to power transmission devices including speed changers, torque converters and automatic transmissions intended for use in power-driven vehicles of all types including those intended for vertical or inclined travel. The invention is also applicable to a wide range of hoisting, reeling and conveying mechanisms, and the like.

In my co-pending application Serial No. 87,565, filed February 7, 1961, there is described and claimed a drive means including a support, a rotary input member mounted thereon, a member pivotally mounted for angular movement about an axis parallel to the axis of the input member, a rotary output member journalled on said pivoted member for rotation about an axis parallel to and spaced from the axis of rotation of said input member, gear means operatively connecting the said input and output members for rotation in opposite senses, a reaction member engaging the output member, and means for rotating the input member, the relation between the reaction member and the said pivotal axis being such that torque applied to the input member is divided into two components, one urging the output member against the reaction member and the other rotating the output member about its axis. The present application is directed to the use of one or more such drive means in speed changers, torque converters, automatic transmissions and similar mechanisms.

Accordingly, it is an object of the present invention to provide a power transmission device comprising support means, an input member mounted on said support means for rotation about a first axis, an intermediate member, means mounting the intermediate member in operative engagement with the input member for rotation about a second axis laterally spaced from and parallel to the said first axis, a member mounted for pivotal movement about said second axis, a driven member mounted on said pivotally mounted member for rotation about a third axis parallel to and laterally spaced from said second axis, said driven member being in operative engagement with said intermediate member, a friction wheel associated with said driven member for rotation therewith, an output shaft journalled for rotation about said first axis, a friction cone having its axis coincident with said first axis, said friction cone being operatively connected with the said output shaft, means mounting the friction cone for translational movement toward and away from the friction wheel, means urging the friction cone toward the friction wheel, and means for rotating the said input member.

A further object is the provision of a power transmission device of the character described, including a plurality of subassemblies each comprising a said intermediate member, a said pivotally mounted member, a said driven member and a said friction wheel, said subassemblies being angularly spaced about said first axis.

Another object is the provision of a device such as described in the preceding paragraph, the means for urging the friction cone toward the friction wheel being responsive to the rotational speed of the input member, said means comprising, for example, a centrifugal governor.

Another object is the provision of a device of the character described, including means for preventing engagement between the friction wheel and the friction cone at lower speeds of the input member, thus providing an automatic clutching feature. The device of the present invention, omitting the speed responsive means and the automatic clutching feature, may advantageously be employed in a speed changing mechanism. When provided with automatic means for controlling the relationship between the friction wheel and the friction cone, it constitutes an efficient torque converter; and when the speed responsive means and automatic clutching feature are included, the device of the present invention constitutes a fully automatic transmission.

Other and further objects, features and advantages will be apparent from the description which follows, read in connection with the accompanying drawings, in which:

FIGURE 1 is an axial section through a speed changing device and torque converter constructed in accordance with the invention;

FIGURE 2 is a transverse section on line 2—2 of FIGURE 1;

FIGURE 3 is a fragmentary transverse section on line 3—3 of FIGURE 1 with the friction cone in the dotted position;

FIGURE 4 is an axial section through an automatic transmission constructed in accordance with the invention; and FIGURES 5, 6 and 7 are transverse sections on lines 5—5, 6—6 and 7—7, respectively, of FIGURE 4.

In order to facilitate an understanding of the invention, reference is made to the embodiments thereof shown in the accompanying drawings and detailed descriptive language is employed. It will nevertheless be understood that no limitation of the invention is thereby intended and that various changes and alterations are contemplated such as would ordinarily occur to one skilled in the art to which the invention relates.

Referring to FIGURES 1, 2 and 3, the mechanism of the present invention is enclosed within a casing 10 comprising a cylindrical portion 11, one end of which joins a generally conical portion 12 terminating in a boss 13. The other end of the cylindrical portion 11 is closed by a plate 14 having a thickened portion 15 which constitutes, in the present embodiment, the "support means" of the appended claims. An input member 16, which is shown as a spur gear in the present case, is fast on an input shaft 18 which is journalled in the support member 15 by means of bearings 17.

Referring to FIGURE 2, it will be seen that three subassemblies are equiangularly spaced about the input member 16, each said subassembly comprising a gear 19 journalled on a stub shaft 20 fixed in the support member 15, the gears 19 being in constant meshing engagement with the input member 16. The gears 19 are the "intermediate members" of the appended claims. In addition to the gear 19 each shaft 20 supports a member 21 journalled on bearings 22 for pivotal movement about the shaft 20, each member 21 being biased toward a radially extended position by means of a light spring 21'. Each of the members 21 supports, at its free end, a driven member comprising a shaft 23 journalled in bearings 24, on which shaft 23 is fixed a gear 25 in constant meshing engagement with the intermediate member 19. A friction wheel 26 is secured on the opposite end of each shaft 24.

An output shaft 27 is journalled in bearings 28 and extends through an axial bore 29 in the boss 13, the inner end of the shaft 27 being provided with splines 30. A friction cone 31, having its larger open end directed toward the friction wheels 26, is mounted in splined engagement with the shaft 27 for rectilinear axial sliding movement toward and away from the friction wheels 26, the limits of such movement being illustrated in solid and broken lines, respectively, in FIGURE 1. At its smaller end the cone 31 is grooved at 32, the groove being engaged by the prongs of a shifter fork 33 pivoted at 34 on the casing portion 12. Preferably, a spring 35 is fastened between the outer end 36 of the fork 33 and any suitable abutment 37.

As mentioned above, the members 21 are lightly urged, by the springs 21′, toward a radially extended position in which the friction wheels 26 engage the inner surface of the cone 31 at or near its greatest diameter. Thus, when torque is applied to the input shaft 18 and transmitted to the friction wheels 26 through the gears 16, 19 and 25 and shafts 23, such torque is divided into components urging the friction wheels 26 against the cone 31 and components rotating the friction wheels 26, in the same rotative sense, about their respective axes. The cone 31 is thus set in motion and the torque imparted to it through the friction wheels 26 is transmitted to the output shaft by reason of the splined engagement therewith of the cone 31.

The axial position of the cone 31 may be adjusted manually or automatically, thus adapting the present device for use as a simple speed changer, on the one hand, or a torque converter on the other. If the pressure and rate of the spring 35 are suitably chosen in relation to the load imposed on the output shaft 27, the cone 31 will automatically shift toward the friction wheels 26 as the load decreases, thus reducing the drive ratio and increasing the speed of the output shaft or allowing the power applied to input shaft 18 to be reduced, as desired. Conversely, as the load on the output shaft 27 increases, the cone 31 automatically shifts to provide a greater drive ratio.

The friction wheels 26 engage tightly against the cone 31 in all positions of the latter, due to the aforementioned torque dividing characteristic of the device.

The axial position of the cone may also be controlled in accordance with the rotative speed of the input shaft, thus providing a fully automatic transmission as illustrated in FIGURES 4 to 7, inclusive. In FIGURE 4, for the sake of clarity, only a single subassembly of intermediate member, pivoted member, driven member and friction wheel is illustrated. The device is housed in a casing 40 comprising a cylindrical portion 41, one end of which is joined to a generally conical portion 42 having a boss 42′. The other end of the cylindrical portion 41 is closed by a plate 43 having a hollow boss 44, the outer end 45 of which is centrally apertured to journal the input shaft 46. The latter is provided with a bore 47 at its inner end to receive a shaft 48 which is slidable in the bore 47. The inner end of shaft 46 is journalled in the thickened portion 49 of a web 50 which extends transversely across the cylindrical portion 41 of the casing 40, the thickened portion 49 comprising the "support member" of the appended claims.

The shaft 46 carries a centrifugal governor comprising a central body 51 in sliding engagement with the shaft 46, movement of the body 51 toward the right being limited by a collar 52. The body 51 is provided with opposite radial bifurcated arms 53 to which are pivoted levers 54 carrying weights 55 at their outer ends. The inner ends of the levers 54 are pivoted to links 56, the opposite ends of which are pivoted to the respective ends of a pin 57 which extends through an aperture in shaft 48 in tight engagement therewith and is slidable relative to the shaft 46 by reason of slots 58 in the latter. A helical spring 59 surrounds the shaft 46 between a collar 60 which abuts the pin 57 and a shipper collar 61 which is slidable on the shaft 46. The position of shipper collar 61, and hence the pressure of the spring 59, may be controlled by means of a fork 62 extending through a slot 63 in the boss 44 and pivoted between ears 64 formed thereon.

An input member 65, corresponding to the input member 16 of FIGURE 1, is secured on shaft 46 and engages intermediate members 66, mounted as previously described on stub shafts 67. The latter also carry pivoted members 68 which journal driven members as previously described and each comprising a shaft 69, gear 70 meshing with the intermediate member 66 and friction wheel 71. Pivoted members 68 are biased away from radial position (counterclockwise in FIGURE 6) by light springs 72′ secured on reduced portions 67′ of shafts 67 so that, in inactive position, the friction wheels 71 are slightly spaced from friction cone 72, as shown in FIGURE 4. Each shaft portion 67′ also pivots an L-shaped lever 73 (FIG. 6) to one end of which is connected an end of a tension spring 74, the other end of which is fastened to the outer portion of pivoted member 68 which journals the shaft 69. The springs 74, when under tension, urge the members 68 toward radial position (clockwise in FIG. 6). Each shaft 67 carries a grooved disc 75 on which the spring 74 seats when the member 68 occupies an inward position as hereinafter explained.

Each lever 73 is pivotally connected at its end opposite the spring 74, to one end of a link 76, the other bifurcated end of which is pinned to a lever 77 which is pivoted to a collar 78 journalled on shaft 46. The lever 77 is formed to provide a cam surface 79 which extends along the inner edge of the lever, over the hump 79′, and outwardly to the extremity of the lever. The shaft 48 is connected, thrustwise, to shaft 80 which is slidable within a bore 81 in the inner end of an output shaft 82 journalled in the boss 42′. The thrust connection between shafts 48 and 80 includes a collar 83 threaded on the end of shaft 80 and enclosing a bearing 84 secured on the end of shaft 48. The collar 83 carries cam follower rollers 85 each engaging one of the cam surfaces 79 formed on levers 77. Friction cone 72 is secured to shaft 80 by a pin 86, the latter being slidable in slots 87 formed in output shaft 82, the cone 72 having splined engagement with output shaft 82. The cone 72 therefore moves translationally with the shaft 48 and rotationally with the shaft 82.

When the input shaft 46 is rotated at low speed, the various elements remain in their relative positions shown in FIGURE 4, and no torque is transmitted since the wheels 71 do not engage the cone 72. As the speed of shaft 46 increases the fly-weights 55 move outwardly causing the shaft 48 and cone 72 to move toward the left in FIGURE 4. This causes the cam follower rollers 85 to actuate the cam levers 77 to apply tension to the springs 74, overcoming the pressure of springs 72′ and urging the pivoted members 68, with shafts 69 and wheels 71, outwardly. As the cone 72 engages the rotating friction wheels 71 the load on shaft 82 is picked up, with momentary slippage of wheels 71 on cone 72, at a high ratio due to the fact that the wheels 71 engage a large diameter portion of cone 72. As the speed of input shaft 46 is increased further, shaft 48 and cone 72 are drawn further to the left, decreasing the drive ratio between the shafts 46 and 82 as increasingly smaller diameters of cone 72 contact the wheels 71 and move the pivoted members 68 inwardly against the tension of springs 74. As will be apparent, as the ratio becomes less the pressure of wheels 71 on cone 72 increases, due not only to the springs 74 but also to the above-mentioned torque dividing characteristic.

If, now, the load increases without a corresponding increase in power input, the speed of the input shaft 46 will decrease, moving the cone 72 to the right and increasing the drive ratio until a position is reached corresponding to the increased load. If the power is increased, the opposite adjustment is automatically made to establish equilibrium at an increased speed.

It will be understood that the "intermediate members" of the devices described and claimed herein correspond to the input member of the device of said earlier application, so far as the torque dividing characteristic is concerned. Also, it will be apparent that, in the two embodiments herein described and illustrated, the devices are designed for opposite rotation of the input shafts.

Having thus described the invention, what is claimed as new and desired to be secured by Letters Patent is:

1. In a power transmission device, the combination of support means, an input member mounted on said support means for rotation about a first axis, an intermediate member rotatably mounted on said support means laterally of and in operative engagement with said input member for rotation about a second axis parallel to said first axis, a pivotally mounted member mounted on said support means for angular movement about said second axis, a driven member mounted on said pivotally mounted member for rotation about a third axis disposed laterally of said second axis, said driven member being in operative engagement with said intermediate member, a friction wheel connected to said driven member for rotation therewith, an output shaft journalled in alignment with said first axis, a hollow friction cone in splined engagement with said output shaft and having its larger end disposed toward said friction wheel whereby any engagement between the two occurs at the inner surface of the friction cone, means urging said friction cone toward said friction wheel, and means for rotating said input member in the direction to urge said pivotally mounted member to swing said friction wheel away from said first axis.

2. In a power transmission device, the combination of support means, an input member mounted on said support means for rotation about a first axis, an intermediate member, means mounting said intermediate member in operative engagement with said input member for rotation about a second axis laterally spaced from and parallel to said first axis, a pivotally mounted member, means mounting said pivotally mounted member for angular movement about said second axis, a driven member mounted on said pivotally mounted member for rotation about a third axis laterally spaced from said second axis, said driven member being in operative engagement with said intermediate member, a friction wheel connected to said driven member for rotation therewith, an output shaft journalled for rotation about said first axis, a hollow friction cone having its axis coincident with said first axis and having its larger end disposed toward said friction wheel whereby any engagement between the two occurs at the inner surface of the friction cone, said friction cone being operatively connected with said output shaft, means mounting said friction cone for rectilinear axial translational movement toward and away from said friction wheel, means urging said friction cone toward said friction wheel, and means for rotating said input member in the direction to urge said pivotally mounted member to swing said friction wheel away from said first axis.

3. A device according to claim 2, including a plurality of subassemblies each comprising a said intermediate member, a said pivotally mounted member, a said driven member and a said friction wheel, said subassemblies being angularly spaced about said first axis.

4. A device according to claim 2, said support means being fixed and said input member comprising a rotary member journaled on said support means, said intermediate member being in toothed engagement with said input member.

5. A device according to claim 2, said friction cone being hollow and open at its larger end and having its larger end directed toward said friction wheel, the radius of said larger end exceeding the maximum spacing of said first and third axes.

6. A device according to claim 2, said friction cone having splined connection with said output shaft.

7. A device according to claim 2, said means urging said friction cone being responsive to the rotational speed of said input member.

8. A device according to claim 2, said means urging said friction cone comprising a centrifugal governor, means operatively connecting said governor with said input member for rotation therewith, and means operatively connecting said governor with said friction cone.

9. A device according to claim 2, including means preventing engagement of said friction wheel with said friction cone at lower speeds of said input member.

References Cited by the Examiner
UNITED STATES PATENTS

| 898,327 | 9/1908 | Couch | 74—191 |
| 2,139,560 | 12/1938 | Olson | 74—191 |

DON A. WAITE, *Primary Examiner.*